United States Patent [19]

Nielsen

[11] Patent Number: 5,953,415
[45] Date of Patent: Sep. 14, 1999

[54] FINGERPRINTING PLAIN TEXT INFORMATION

[75] Inventor: Jakob Nielsen, Atherton, Calif.

[73] Assignee: Sun Microsystems, Inc., Palo Alto, Calif.

[21] Appl. No.: 08/621,671

[22] Filed: Mar. 25, 1996

[51] Int. Cl.⁶ ..................................................... H04L 9/00
[52] U.S. Cl. ................................................................. 380/4
[58] Field of Search ..................................................... 380/4

[56] References Cited

U.S. PATENT DOCUMENTS

| | | |
|---|---|---|
| 5,291,598 | 3/1994 | Grundy . |
| 5,530,759 | 6/1996 | Braudaway et al. ................... 380/4 |
| 5,568,570 | 10/1996 | Rabbani ................................ 382/238 |
| 5,613,004 | 3/1997 | Cooperman et al. .................. 380/4 |
| 5,617,119 | 4/1997 | Briggs et al. ......................... 380/54 |
| 5,636,292 | 6/1997 | Rhoads .................................. 382/232 |
| 5,664,018 | 9/1997 | Leighton ............................... 380/4 |
| 5,687,236 | 11/1997 | Moskowitz et al. .................. 380/4 |

FOREIGN PATENT DOCUMENTS 0 567 800  11/1993  European Pat. Off. .
0 665 486  8/1995   European Pat. Off. .

OTHER PUBLICATIONS

Jack T. Brassil et al., "Electronic Marking and Identification Techniques to Discourage Document Copying," in *IEEE Journal on Selected Areas in Communications*, vol. 13, No. 8, New York, NY, US, pp. 1495–1503, (Oct. 1995).

Bender W. et al., "Techniques for Data Hiding," in *IBM Systems Journal*, vol. 35, No. 3 & 4, pp. 313–335, (Mar. 1996).

*Primary Examiner*—Salvatore Cangialosi
*Attorney, Agent, or Firm*—Townsend and Townsend and Crew LLP

[57] ABSTRACT

A system for enhancing security of electronic documents distribution wherein electronic documents are fingerprinted with one or more modifications to the document text. The text modifications may be selected so that multiple copies of the same master document will all have the same meaning. By examining text modifications in an unauthorized copy, one can identify the authorized source. The ability to detect the source of a copy discourages unauthorized distribution. This electronic document distribution system may find particular application on the Internet.

43 Claims, 4 Drawing Sheets

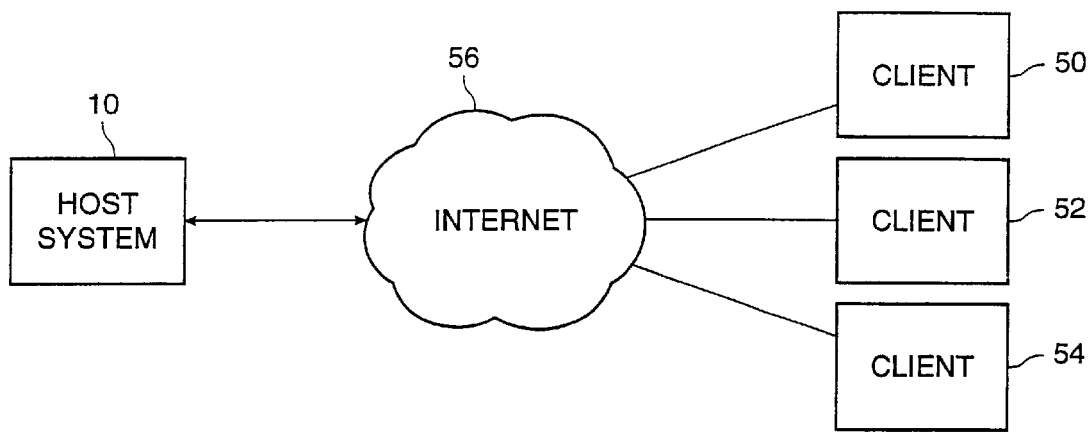

FIG. 1B

As an online publishing enthusiast, I sometimes get ridiculed for
having written a traditional printed book about hypertext
and the Internet. I don't feel apologetic about publishing
208 — something in print because paper remains the optimal medium for
        <FP>some forms of writing, <u>especially</u> for long works like a    202
      —some forms of writing, <u>particularly</u> for long works like a </FP>
210 book.

It is an unfortunate fact that current computer screens lead to a
reading speed that is approximately 25% slower than reading
from paper. We have invented better screens and it is just a
matter of time before reading from computers is as good as
reading from paper, but for the time being we have to design our
information for the actual screens in use around the world.

The reduced reading speed on computers can be compensated by good
hypertext design that allows the user to read less
information and to find it faster. A typical example is online
help and documentation: because the information is right there
on the computer, there is no need to spend time finding the
hardcopy manual, and because of good search tools and hypertext
212 — <u>links</u> between related information, users can go directly to the
      <FP> one or two sections that <u>contain</u> the answer to
    —one or two sections that <u>have</u> the answer to </FP>—204
214 their problem. After all, Nielsen's first law of computer
216 documentation is that users don't read it. The second law is that
    <FP> if they read it anyway, <u>it's</u> because they are
   —if they read it anyway, <u>it is</u> because they are </FP>—206
218  in deep trouble and need the answer to a specific problem. Thus,
somebody reading a manual won't really read it cover-to-cover, so
online presentation makes perfect sense.

FIG. 2

FINGERPRINTING PLAIN TEXT INFORMATION

BACKGROUND OF THE INVENTION

The present invention relates to security enhancement for distribution of electronic documents and more particularly to techniques for "fingerprinting" electronic documents to identify a particular authorized recipient.

With the development of the Internet and other electronic networks, it has become desirable to distribute text documents electronically. Electronic distribution of text documents is both faster and cheaper than distribution of paper copies. However, if controlled distribution is desired the low cost and instantaneousness of electronic distribution in combination with the ease of copying electronic documents give rise to a serious security problem. Once an electronic document is transmitted to one party, it may be easily copied and distributed to others without authorization by the owner of rights in the electronic document or often without even his or her knowledge. This type of illicit document distribution may deprive the owner of income or may lead to unauthorized disclosure of otherwise confidential information.

It is known to particularize paper documents to identify an authorized recipient by slight variation in the appearance of fonts. By close analysis of font appearance, one can determine the source of an unauthorized copy. This technique is however largely useless in the context of electronic document distribution where it is typical to transmit only text without font appearance information.

What is needed is a system for enhancing the security of electronic document distribution.

SUMMARY OF THE INVENTION

By virtue of the present invention, a system for enhancing security of electronic documents distribution is provided wherein electronic documents are fingerprinted with one or more modifications to the document text. The text modifications may be selected so that multiple copies of the same master document will all have the same meaning. By examining text modifications in an unauthorized copy, one can identify the authorized source. The ability to detect the source of a copy discourages unauthorized distribution. An electronic document distribution system according to the present invention may find particular application on the Internet.

In one embodiment, each authorized recipient is assigned a binary customer number. When a document is to be electronically transmitted to a particular customer, the document text is modified in accordance with the binary customer number without affecting the meaning.

Preparation of a master document for electronic distribution may begin with identification of places in the document for which two or more alternative strings would provide the same meaning. For example, there may be places in the document where a comma may either be inserted or left out without changing the meaning. The two alternative strings would then be "," and the null string. As many such instances would be identified as there are digits in the binary customer number used to identify authorized recipients. Tags in the master document identify each such instance and present the alternative strings.

If, for example, a host system receives a request for an electronic document copy from a remote user, it may respond by requesting user identification information. The user identification information is the basis for obtaining the binary customer number. In one embodiment, the binary customer number is combined with a document key for the document to obtain a copy key. The host system then scans for tags in the master document. For each tag, the host system selects an alternative for inclusion in the copy to be transmitted based on a corresponding digit in the copy key.

Identification of the source of an unauthorized copy involves finding, for each tag in the master document, the alternative selected in the copy. A copy key is constructed digit-by-digit in this way. The customer number of the original recipient is then recoverable by combining the copy key with the document key. The owner of the document may then contact the original recipient responsible for the unauthorized copy.

Another aspect of the present invention addresses the problem of minor revisions by intermediate copyists. A revision to a text string that was modified in accordance with the copy key will of course prevent perfect recovery of the copy key. One or more bits of the copy key may be corrupted. The effect of such revisions is analogous to noise in a communications system. However, applying an error correcting code to the copy key removes the effects of minor revisions.

A further understanding of the nature and advantages of the inventions herein may be realized by reference to the remaining portions of the specification and the attached drawings.

BRIEF DESCRIPTION OF THE DRAWINGS

FIG. 1B depicts the interconnection of the host computer system to remote clients.

FIG. 2 depicts an excerpt from a master document prepared for electronic distribution in accordance with one embodiment of the present invention.

DESCRIPTION OF THE SPECIFIC EMBODIMENT

Figure 1A:
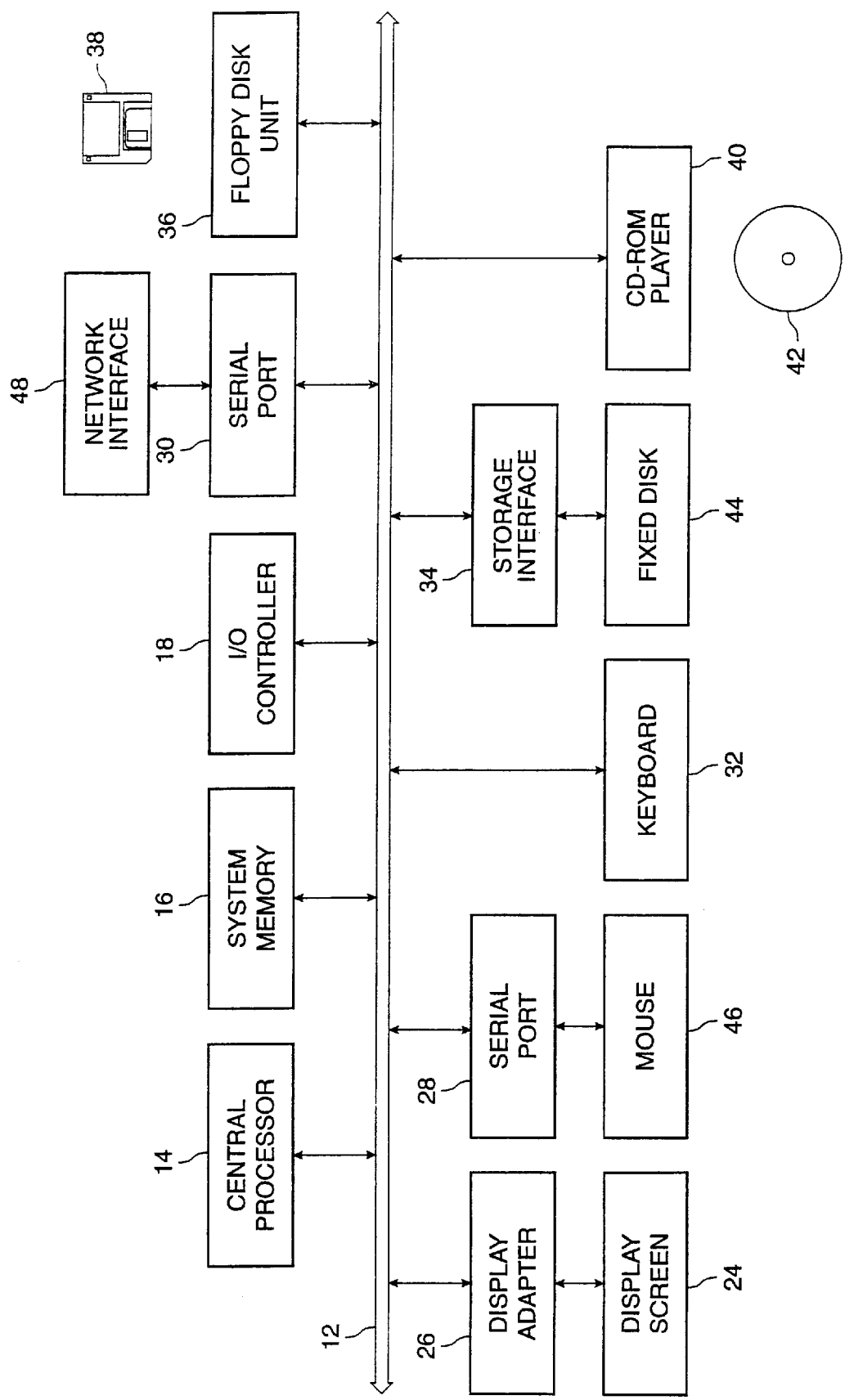
FIG. 1A depicts a block diagram of a host computer system suitable for implementing the present invention.

FIG. 1A depicts a block diagram of a host computer system 10 suitable for implementing the present invention. Host computer system 10 includes a bus 12 which interconnects major subsystems such as a central processor 14, a system memory 16 (typically RAM), an input/output (I/O) controller 18, an external device such as a display screen 24 via display adapter 26, serial ports 28 and 30, a keyboard 32, a storage interface 34, a floppy disk drive 36 operative to receive a floppy disk 38, and a CD-ROM player 40 operative to receive a CD-ROM 42. Storage interface 34 may connect to a fixed disk drive 44. Fixed disk drive 44 may be a part of host computer system 10 or may be separate and accessed through other interface systems. Many other devices can be connected such as a mouse 46 connected via serial port 28 and a network interface 48 connected via serial port 30. Network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1A to be present to practice the present invention, as discussed below. The devices and subsystems may be interconnected in different ways from that shown in FIG. 1A. The operation of a computer system such as that shown in FIG. 1A is readily known in the art and is not discussed in detail in this application. Code to implement the present invention may be operably disposed or stored in computer-readable storage media such as system memory 16, fixed disk 44, or floppy disk 38.

FIG. 1B depicts the interconnection of host computer system 10 to client systems 50, 52, and 54. FIG. 1B depicts the Internet 56 interconnecting client systems 50, 52, and 54. Modem 48 or some other network interface provides the connection from host computer system 10 to the Internet 56. Protocols for exchanging data via the Internet are well known and need not be discussed herein. Although FIG. 1B depicts the use of the Internet for exchanging data, the present invention is not limited to the Internet.

The present invention relates to enhancing security of electronic document distribution. An electronic document to be distributed is resident on fixed disk 44 or some other storage device accessible via storage interface 34. In one scenario, host system 10 receives a request via network interface 56 for this electronic document from one of the client systems 50, 52, and 54. This request could be delivered, e.g., as part of an e-mail message or as part of an FTP document request. Also, the electronic document could be a web page and the request could arise in the course of web browsing. Host system 10 responds by copying the electronic document and sending it to the requesting client via network interface 56. In another scenario, one or more of the client systems may have a subscription to a periodically generated series of electronic documents. The electronic document is then copied and sent to the subscribing client system even without a request. The present invention is not restricted to distribution of electronic documents over a network. Electronic document distribution may be via magnetic or optical storage medium, for example.

However copies of an electronic document are distributed, a problem arises in that it is difficult to control further copying of the document by the recipients. The present invention provides that the text of individual copies may be modified slightly to identify the authorized recipient. The modifications may be made in such a way so as to preserve the meaning of the copies. Any illegitimate copy may then be analyzed to determine the originating authorized recipient.

In one embodiment, each authorized recipient is identified by a binary user identifier or customer number. For a system with 500,000 authorized recipients, twenty binary digits will suffice to define the customer number and incorporate a checksum digit. For each document, a random document key is generated with as many binary digits as used for the customer numbers. This document number is referred to as the document encoding key. Several documents may share the same key, so the method does not limit the number of documents. A database may be maintained with all the customer numbers and all the document encoding keys.

One way of preparing a document for copying in accordance with the invention is for a copy editor to examine the document for locations where a small segment may be changed without affecting the meaning. For example, one could use either "for example" or "e.g." and achieve the same meaning. Another example is a point where a comma may either be inserted or left out. In other instances, a colon or a semicolon would be equivalent. The copy editor identifies as many such locations as there are digits to be used in the customer number. (More may be needed if error correcting code is to be applied as explained below.)

FIG. 2 depicts an excerpt 200 from a master document prepared for electronic distribution in accordance with one embodiment of the present invention. There are three tags 202, 204, and 206 where there are two alternative strings that can be used to express the same meaning. The beginning of each tag is indicated by "<FP>." The end of each tag is indicated by "</FP>." In the preferred embodiment, each alternative string is a complete line. The delimiter between the alternatives is thus the end of the line within the tag. If a character or other string is to be used as the delimiter, it is specified as an attribute within the marker indicating the beginning of the tag, e.g., <FP DELIMITER=","> would be used to make the comma serve as the delimiter.

For tag 202, a line 208 includes "especially" where a line 210 includes "particularly." For tag 204, a line 212 includes "contain" where a line 214 includes "have." For tag 206 a line 216 includes "it's" where a line 218 includes "it is." For ease of reference, the quoted strings are underlined in FIG. 2. In one embodiment, the fingerprinting process involves selecting an alternative for each tag. The sequence of selected alternatives uniquely represents the identity of the authorized recipient of the copy.

Figure 3:
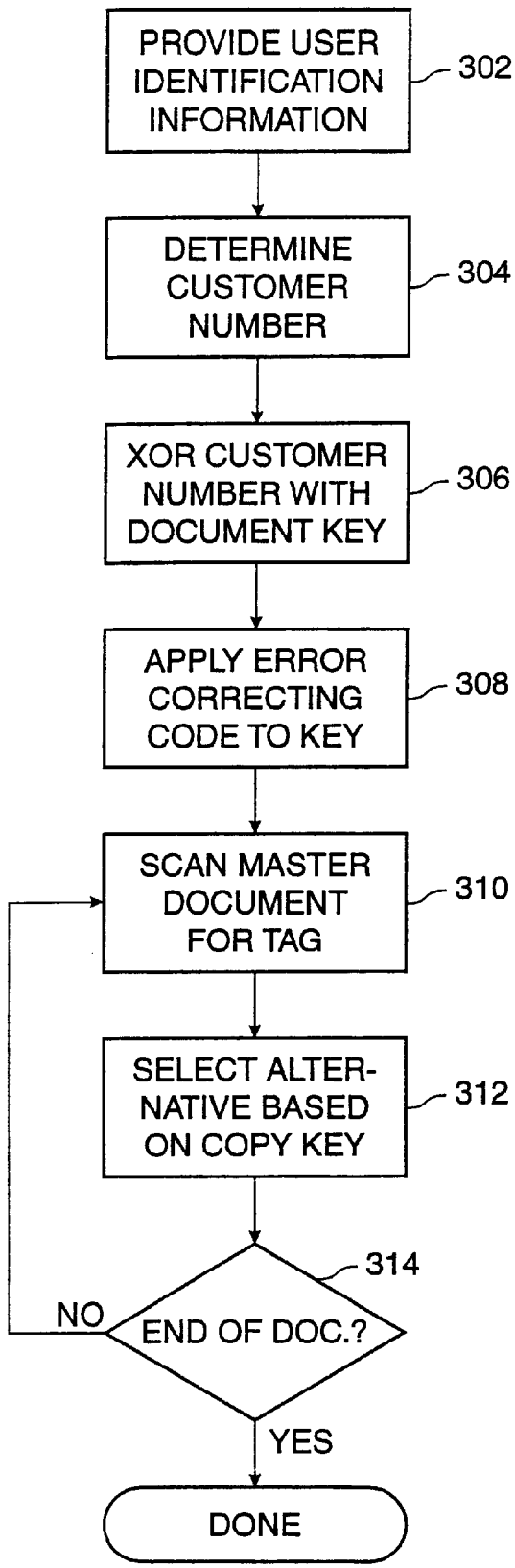
FIG. 3 depicts a flowchart describing steps of electronically copying a master document in accordance with one embodiment of the present invention.

FIG. 3 depicts a flowchart describing steps of electronically copying a master document in accordance with one embodiment of the present invention. At step 302, user identification information is provided. Depending on the context this step may occur in a number of ways. If a document is being requested over the Internet, host system 10 may prompt the user for an e-mail address or password. If the user has a subscription to the document, host system 10 will already have the user identification information. At step 304, host system 10 determines a customer number for the user based on the user identification information. A checksum may also be incorporated within the customer number. The user may either have a pre-assigned customer number that will be retrieved from a database or one is generated so as to be different from previously assigned customer numbers.

At step 306, host system 10 combines the customer number with the document key of the document to develop a copy key to be applied to the document. This combination may be a logical combination and preferably occurs as a logical exclusive-OR.

At step 308, host system 10 optionally applies an error correcting code such as a block code to the copy key, possibly expanding the length of the copy key. Any error correcting code may be used within the scope of the present invention. This step allows the security enhancement system of the present invention to function even with revisions to the document by intermediate copyists.

At step 310, host system 10 begins scanning through the master document looking for an <FP> tag. At step 312, when a tag is identified, one of the alternatives is selected based on a bit of the copy key. Preferably, for the first tag the first bit is used and so on. For example, referring again to FIG. 2, if the first bit of the copy key is 0, the word "especially" is selected at step 312. If the first bit is 1, the word "particularly" is selected. At step 314, host system 10 checks to see if the end of the master document has been reached. If not, it returns to step 310 to search for the next tag. If the end has been reached, then an alternative has been selected for each tag. The fingerprinted copy for the user does not include the <FP> tags but rather incorporates each alternative string selected at step 312. Host system 10 may then copy this document on a floppy disk, transmit it over a network via network interface 48, or distribute it to the user in some other way.

Figure 4:
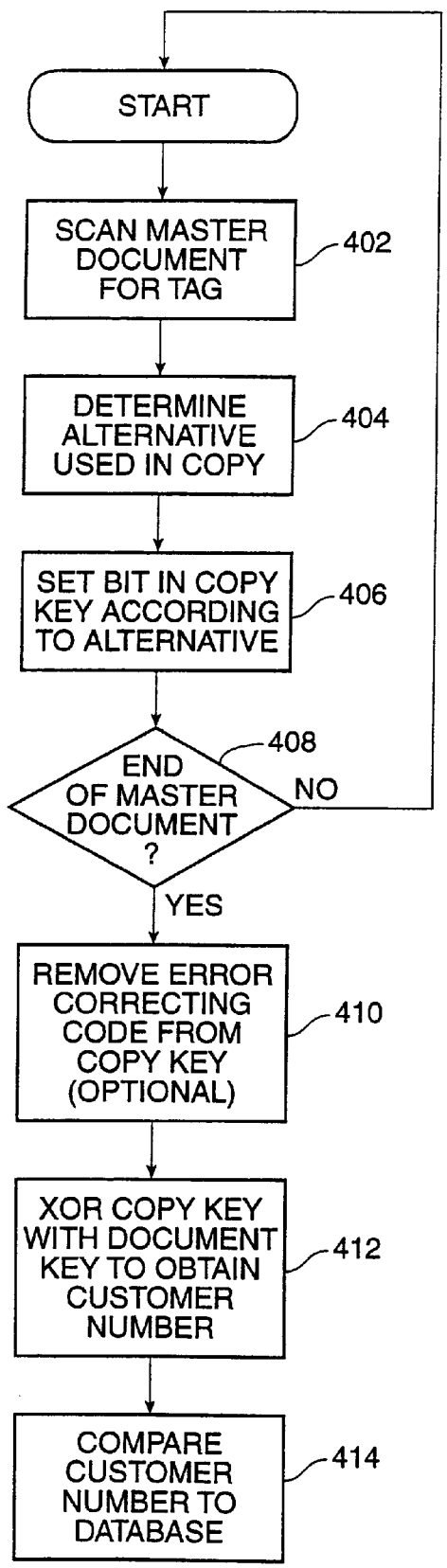
FIG. 4 depicts a flowchart describing steps of ascertaining the source of a document copy in accordance with one embodiment of the present invention.

FIG. 4 depicts a flowchart describing steps of ascertaining the source of a document copy in accordance with one embodiment of the present invention. Assuming that a suspected illicit copy of an electronic document is seized, the copyright holder may determine the source from among the authorized recipients. Note that this is also possible if the illicit copy is a paper copy.

The analysis may make use of the master document copy that includes the <FP> tags. The discussion of the steps will assume use of host system 10, as a representative computer, but one or more of the steps may be performed manually. At step 402, scanning through the master document begins. Once a tag is found, the illicit copy is examined to determine which alternative is incorporated for that tag at step 404. At step 406, the appropriate bit in the copy key is set in accordance with the alternative identified at step 402. At step 408, host system 10 determines if the last tag has been reached in the master document. If not, processing returns to step 402. If the last tag has been reached, a complete copy key has been extracted from the suspected illicit copy. At step 410, if an error correcting code has been applied to the copy key, it is removed. At step 412, the extracted copy key is combined with the document key for the document to obtain the customer number. In the preferred embodiment, this step is a logical exclusive OR between the extracted copy key and the document key. If a checksum was originally included in the customer number, the validity of the customer number information may be checked at this point. At step 414, the customer number is checked against a database to identify which authorized recipient is the source of the illicit copy.

In the foregoing specification, the invention has been described with reference to specific exemplary embodiments thereof. It will, however, be evident that various modifications and changes may be made thereunto without departing from the broader spirit and scope of the invention as set forth in the appended claims.

For example, the customer number may be represented in a base other than base-2. Each tag in the master document would then include more than two alternatives. For base-3, each digit of the customer number would select from among three alternative strings.

Furthermore, the flowcharts described herein are illustrative of merely the broad logical flow of steps to achieve a method of the present invention and that steps may be added to, or taken away from the flowchart without departing from the scope of the invention. Further, the order of execution of steps in the flowcharts may be changed without departing from the scope of the invention. Additional considerations in implementing the method described by the flowchart may dictate changes in the selection and order of steps. For example, an error correcting code may be applied to and removed from the customer number rather than the document key. Also, an encryption scheme could be used to obtain the copy key instead of a simple exclusive-OR between the document key and the customer number.

In general, the flowcharts in this specification include one or more steps performed by software routines executing in a computer system. The routines may be implemented by any means as is known in the art. For example, any number of computer programming languages, such as Java, "IC", Pascal, FORTRAN, assembly language, etc., may be used. Further, various programming approaches such as procedural, object oriented or artificial intelligence techniques may be employed.

Many such changes or modifications will be readily apparent to one of ordinary skill in the art. The specification and drawings are, accordingly, to be regarded in an illustrative rather than a restrictive sense, the invention being limited only by the provided claims and their full scope of equivalents.

What is claimed is:

1. A computer-implemented method of fingerprinting an electronic document comprising the steps of:

providing a user identifier to identify one or more recipients of said electronic document;

identifying a text segment of said electronic document that has at least two alternative character strings that have substantially the same meaning; and modifying said text segment of said electronic document, said modifying step includes selecting one of said alternative character strings for said text segment in accordance with said user identifier.

2. The method of claim 1 wherein said modifying step comprises:

combining a document encoding key with said user identifier; and selecting an alternative character string for each of said one or more selected segments in accordance with a result of said combining step.

3. The method of claim 2 wherein said selecting step comprises:

applying a n error correcting code to a result of said combining step; and selecting an alternative character string for each of said one or more selected segments in accordance with a result of said error correcting code applying step.

4. The method of claim 2 wherein said combining step comprises:

logically combining said document encoding key with said user identifier.

5. The method of claim 4 wherein said logically combining step comprises:

generating an XOR between binary representations of said document encoding key and said user identifier.

6. The method of claim 2 wherein said selecting step comprises:

selecting between first and second alternative character strings for each of said one or more selected segments in accordance with corresponding binary digits of said result of said combining step.

7. The method of claim 1 wherein said modifying step comprises:

scanning for one or more tags in a master copy of said electronic document indicating locations of said one or more selected segments.

8. The method of claim 1 wherein said providing step comprises:

accepting user identification information input; and retrieving said user identifier from a database in accordance with said user identification information input.

9. The method of claim 1 wherein said providing step comprises:

accepting user identification information input; and generating said user identifier in accordance with said user identification information input.

10. The method of claim 1 further comprising the step of:
transmitting said electronic document as modified over a network.

11. The method of claim 1 wherein said modifying step is performed so that said user identifier does not affect a meaning of said document.

12. A computer-implemented method of detecting copying of an electronic document comprising the steps of:
identifying one or more segments of said electronic document indicative of a source of said electronic document; and
extracting a copy key of said electronic document based on text of said one or more identified segments; and
replacing said one or more identified segments with an alternative segment based on a bit of said copy key.

13. The method of claim 12 wherein said identifying step comprises:
retrieving a reference document;
scanning said reference document for one or more identifier tags; and
identifying said one or more segments to be at positions within said electronic document similar to positions of said identifier tags in said reference document.

14. The method of claim 12 wherein said extracting step comprises:
providing first and second alter-native strings for each of said one or more segments; and
selecting a binary digit of said copy key for each of said one or more segments based on whether the contents of a given segment corresponds to the first or second alternative string.

15. The method of claim 12 further comprising the step of:
removing an error correcting code from said copy key.

16. The method of claim 12 further comprising the step of:
combining said copy key with a document key.

17. The method of claim 16 wherein said combining step comprises:
generating an XOR of said document key and said copy key.

18. The method of claim 16 further comprising the step of:
comparing a result of said combining step to a user identifier database to identify a source of said electronic document.

19. A computer system comprising:
a network interface that receives a document request via a network;
a storage interface that retrieves a master copy of a document from an electronic storage device in accordance with said document request; and
a processing system configured to:
scan said master copy for one or more segments identified by a tag, wherein alternative character strings having similar meanings are available for each of said one or more selected segments;
modify text of said master copy in accordance with user identification information to develop a fingerprinted copy; and
transmit said fingerprinted copy via said network interface.

20. The computer system of claim 19 wherein said processing system is configured to modify said master copy by virtue of being further configured to:
convert said user identification information into a copy key;
select for each of said one or more segments identified by a tag from said alternative strings in accordance with said copy key; and
develop said fingerprinted document copy incorporating said selected alternative strings.

21. The computer system of claim 20 wherein said processing system is configured to select by virtue of being configured to:
combine said copy key with a document key; and
select from said alternative strings based on a result of combining said copy key and said document key.

22. A computer system comprising:
an electronic storage system configured to store a fingerprinted document copy; and
a processing system configured to:
identify one or more segments of said electronic document indicative of a source of said electronic document; and
extract a copy key of said document based on contents of said one or more identified segments; and
replacing said one or more identified segments with an alternative segment based on a bit of said copy key.

23. The computer system of claim 22 wherein said processing system is further configured to:
combine said copy key with a document key to obtain a user identifier.

24. The computer system of claim 23 wherein said processing system is further configured to:
compare said user identifier to a database to identify a source of said fingerprinted copy.

25. A computer system comprising:
a host system storing a master copy of an electronic document; and
one or more remote systems connected to said host system via a network;
wherein said host system is configured to send a selected one of said one or more remote systems a fingerprinted copy of said electronic document by virtue of being configured to:
scan said master copy for one or more segments identified by a tag, wherein alternative character strings having similar meanings are available for each of said one or more selected segments;
modify text of said master copy in accordance with user identification information to develop said fingerprinted copy; and
transmit said fingerprinted copy to said selected remote system.

26. A computer program product that fingerprints documents comprising:
code that provides a user identifier to identify one or more recipients of said electronic document;
code that identifies a text segment of said electronic document that has at least two alternative character strings that have substantially the same meaning;
code that modifies said text segment of said electronic document, said code that modifies includes code that selects one of said alternative character strings for said text segment in accordance with said user identifier; and
a computer readable medium that stores the computer codes.

27. The product of claim 26 wherein said modifying code comprises:
code that combines a document encoding key with said user identifier; and code that selects an alternative character string for each of said one or more selected segments in accordance with a result of said combining code.

28. The product of claim 27 wherein said selecting code comprises:

code that applies an error correcting code to a result of said combining code; and code that selects an alternative character string for each of said one or more selected segments in accordance with a result of said error correcting code applying code.

29. The product of claim 27 wherein said combining code comprises:

code that logically combines said document encoding key with said user identifier.

30. The product of claim 29 wherein said logically combining code comprises:

code that generates an XOR between binary representations of said document encoding key and said user identifier.

31. The product of claim 27 wherein said selecting code comprises:

code that selects between binary alternative character strings for each of said one or more selected segments in accordance with corresponding binary digits of said result of said combining code.

32. The product of claim 26 wherein said modifying code comprises:

code that scans for one or more tags in said electronic document indicating locations of said one or more selected segments; and code that removes said one or more tags.

33. The product of claim 26 wherein said providing code comprises:

code that accepts user identification information input; and code that retrieves said user identifier from a database in accordance with said user identification information input.

34. The product of claim 26 wherein said providing code comprises:

code that accepts user identification information input; and code that generates said user identifier in accordance with said user identification information input.

35. The product of claim 26 further comprising:

code that transmits said electronic document as modified over a network.

36. The product of claim 26 wherein said modifying code operates so that said user identification information does not affect a meaning of said document.

37. A computer program product that detects copying of an electronic document comprising:

code that identifies one or more segments of said electronic document indicative of a source of said electronic document;

code that extracts a copy key of said electronic document based on text of said one or more identified segments;

code that replaces said one or more identified segments with an alternative segment based on a bit of said copy key; and a computer readable medium that stores the codes.

38. The product of claim 37 wherein said identifying code comprises:

code that retrieves a reference document;

code that scans said reference document for one or more identifier tags; and code that identifies said one or more segments to be at positions within said electronic document similar to positions of said identifier tags in said reference document.

39. The product of claim 37 wherein said extracting code comprises:

code that provides a first and second alternative string for each of said one or more segments; and code that selects a binary digit of said copy key for each of said one or more segments based on whether the contents of a given segment is the first or second alternative string.

40. The product of claim 37 further comprising:

code that removes an error correcting code from said copy key.

41. The product of claim 37 further comprising:

code that combines said copy key with a document key.

42. The product of claim 41 wherein said combining code comprises:

code that generates an XOR of said document key and said copy key.

43. The product of claim 41 further comprising:

code that compares a result of said combining code to a user identifier database to identify a source of said electronic document.

* * * * *